United States Patent Office 3,114,933
Patented Dec. 24, 1963

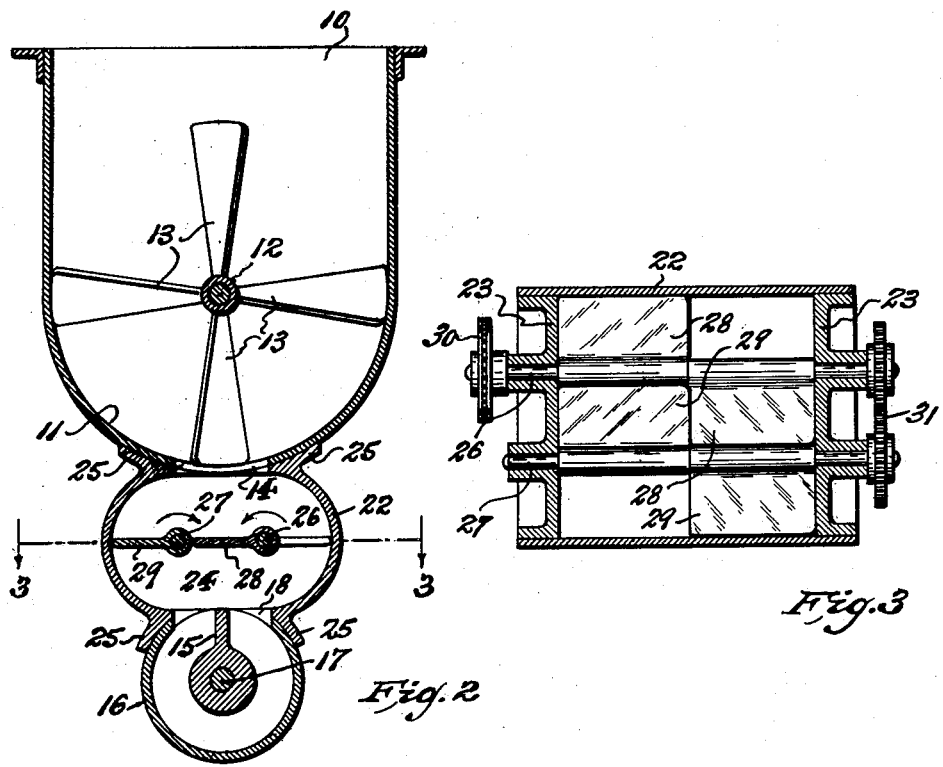
Fig. 2
Fig. 3
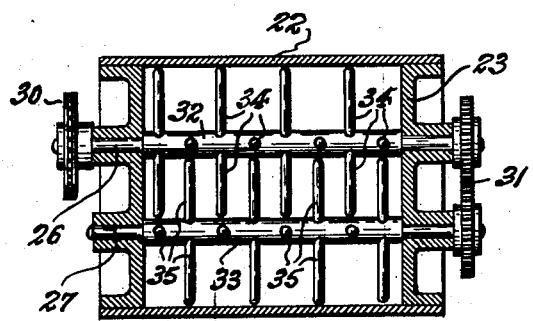
Fig. 4
INVENTORS
CONRAD AMBRETTE &
PAUL AMBRETTE, DECEASED
BY JOSEPHINE AMBRETTE, EXECUTRIX
BY
Richard W Cifelli,
Attorneys

---

3,114,933
APPARATUS FOR CONTINUOUSLY PREPARING AND EXTRUDING PLASTIC COMPOSITIONS
Conrad Ambrette, Westbury, and Paul Ambrette, deceased, late of Westbury, by Josephine Ambrette, executrix, Old Westbury, N.Y., assignors to Ambrette Machinery Corporation, Brooklyn, N.Y., a corporation of New York
Filed Oct. 5, 1961, Ser. No. 144,009
3 Claims. (Cl. 18—12)

This invention relates to improvements in apparatus for continuously preparing and extruding plastic compositions; and the invention has reference, more particularly, to apparatus comprising means to mix the ingredients of a plastic composition, whereby to prepare the same for extrusion, and then to deliver the prepared composition to the receiving end portion of a housed extruding means of the rotated helical screw type, which is operative to extrude the composition through a suitable forming die. This application is a continuation in part of pending application Ser. No. 710,297, filed January 21, 1958, now abandoned.

In the art of extruding materials or substances through a forming die by means of a housed helical screw, rotation of which is adapted to consolidate the material or substance, while exerting pressure thereupon to move the same toward and through said forming die, it has been found desirable to associate the extruding screw means with means to mix together ingredients comprising the material or substance to be extruded, and then deliver the latter to the extruding screw means, thus providing apparatus operative to effect an automatic continuous process. To this end, a mixing or agitating means is provided comprising a vat or chamber which is equipped with means to mix together the ingredients of a composition to be extruded, said vat or chamber having a bottom discharge opening adjacent an end thereof, and an extruding screw means is mounted beneath the vat or chamber, so that its receiving end portion is aligned in communication with the discharge opening of said vat or chamber, whereby the mixed composition can, by gravity, be delivered therethrough to the extruding screw means. It has been found, however, that delivery of a composition by gravity from the mixing or agitating means to the extrusion screw means is not satisfactory, for the reason that the spaces between the helices of the receiving end portion of the extrusion screw means will not be adequately filled, and consequently voids are formed in the delivered composition which substantially reduces build up of pressure application upon the composition which is necessary to attain efficient extrusion of the composition through a forming die served by the extrusion screw. Furthermore, bridging or webbing of the composition in or across the passage leading from the mixing or agitating means to the extrusion screw means is likely to occur, thereby interfering with and sometimes entirely obstructing gravity movement of the composition from the former to the latter, so that output of the extruding screw means is not only diminished, but often produces a defective formation of such composition as is expressed through the forming die.

Having the above in view, it is an object of this invention to provide, an apparatus for preparatory mixing of ingredients of a composition to be extruded, and then delivering the resultant composition to an extruding screw means, through means interposed between the former and the latter for positively feeding the composition to the receiving end portion of the extruding screw means, whereby to assure that the delivered composition will adequately fill the spaces between the helices of said extruding screw means, and so that the composition will be homogeneously consolidated therein, without voids or gaps, and will thus be effective to build up extruding pressure within the same, whereby rapid formation of the extruded composition free from defects, will be attained where the composition is expressed through a forming die served by the extruding screw-means.

This invention has for a further object to provide a force feeding means intermediate the discharge end of a composition mixing means and an extrusion screw means, said feeding means comprising a casing formed to provide a passage between said mixing means and the extrusion screw means, across which passage extend parallel driven shafts respectively provided with radial blades or other radial means which, when revolved in opposite directions, intersect or pass one another in the central area of said passage, whereby not only to force the composition discharged from the mixing means into the extrusion screw means but, by virtue of their relative arrangement, efficiently purge each other of the composition operated upon.

The above and other objects will become apparent from a reading of the following description of illustrative embodiments of this invention in connection with the accompanying drawings thereof, in which drawings:

FIG. 2 is a vertical cross-sectional view, taken on line 2—2 in FIG. 1.

FIG. 3 is a longitudinal horizontal sectional view, taken on line 3—3 in FIG. 2.

FIG. 4 is a view similar to that of FIG. 3, but showing a modified form of the force feeding means.

Figure 1:
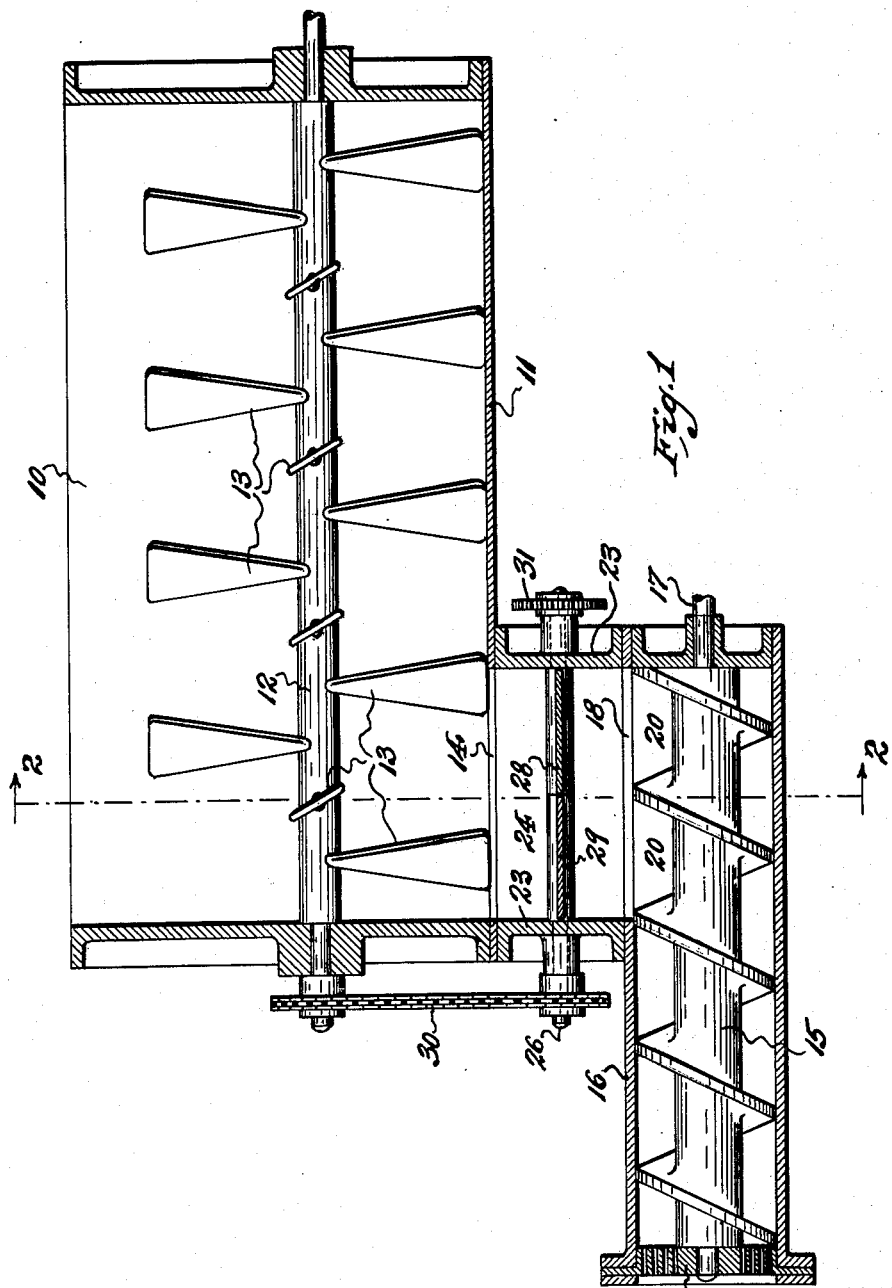
FIG. 1 is a longitudinal sectional view of apparatus according to this invention, showing one and a preferred form of composition force feeding means which is interposed between the discharge end of the composition mixing means and the receiving end portion of an extrusion screw means.

Referring to the drawings, in which like characters of reference indicate corresponding parts, the reference character 10 indicates a longitudinal mixing trough or vat having a semi-cylindrical bottom 11. The ingredients from which a composition desired to be extruded is prepared are introduced into the rearward end of the trough or vat 10. Extending through the interior of the trough or vat is a driven shaft 12, which is concentric to the semi-cylindrical bottom of said trough or vat. Suitably affixed to and spaced along said shaft 12 are a series of radial paddles 13 which, as revolved by said shaft, function to mix and blend the composition ingredients introduced into the trough or vat, whereby to produce the composition desired to be extruded. Said paddles 13 are angularly pitched so that, in addition to the mixing and agitating effect thereof, the same also served to move the produced composition toward the forward end of the trough or vat, adjacent to which, is provided a bottom discharge opening or port 14.

Located below the trough or vat 10 is an extruding screw-means, to the receiving end portion of which the composition discharged from the mixing trough or vat is to be delivered. This extruding screw-means comprises a screw conveyer or worm 15 which is rotatably mounted in the bore of a housing 16, and which is adapted to be power driven by a drive shaft 17 connected with its rearward end. The housing 16 is provided with an opening or port 18 located above one or more rearward helical flights 19 of the screw conveyer or worm, so that said opening or port communicates with composition receiving space or spaces 20 between said rearward flights, said opening or port being preferably coextensive with at least two of said spaces 20. The forward end of the screw conveyer or worm 15 abuts a suitable die 21, which closes over the forward end of the housing 16, and through which the composition is adapted to be extruded by the advancing force exerted thereupon by the screw conveyer or worm, whereby to produce desired extruded formation of the composition.

Interposed between the mixing trough or vat and the extruding screw means, is means for positively or force feeding a produced composition from the former to the latter. This force feeding means comprises a casing 22 having semi-cylindrical sides, the ends of which are closed by end walls 23. The interior of the casing 22 provides a passage 24 which extends in longitudinally parallel relation to and between the mixing trough or vat 10 and the housing 16 of the extruding screw means; said casing being suitably affixed by its upper side to the bottom of the trough or vat 10, and by its lower side to the top side of the housing 16 of the extruding screw means, preferably by flanges 25 adapted to be bolted to said trough or vat and to said housing. The passage 24 at its top or receiving side is aligned for communication with the discharge opening or port 14 of the mixing trough or vat 10, and is likewise open at its bottom or discharge side for communication with the intake opening or port 18 of said housing 16.

Extending horizontally through the interior of the casing 22, and across the passage 24 provided thereby, is a composition transfer means. In a preferred form of said transfer means, as shown in FIGS. 1, 2 and 3, the same comprises a pair of laterally spaced apart horizontal shafts 26 and 27 which straddle the longitudinal axis of the casing 22, and which are journaled through the end walls 23 of said casing. Each shaft is provided at one end with a blade 28 projecting radially in one direction, and of length corresponding to one-half of the axial length of the interior of the casing 22, and each shaft is further provided at its other end with a blade 29 projecting radially in the opposite direction, and likewise of length corresponding to the other half of the horizontal axial length of the interior of the casing 22. One of the shafts, e.g. shaft 26, is power driven in any suitable manner; illustratively, the same can be driven from the shaft 12 of the mixing means by sprocket and chain transmission 30. The other shaft, e.g. shaft 27, can be driven from shaft 26 in opposite direction by gearing 31, whereby the shaft 26 and its blades 28 revolve counterclockwise, whereas the shaft 27 and its blades 29 revolve clockwise. The blades 28 are of such radial extent that the same will revolve between the shaft 27 and a side wall of casing 22, and so that their free edges will sweep the surface of said wall. On the other hand, the blades 29 are of such radial extent that the same will revolve between the shaft 26 and the opposite side wall of casing 22, and so that their free edges will sweep the surface of said opposite wall. The inner ends of blades 28 will sweep the opposed inner ends of the blades 29, when said blades 28 and 29 are revolved in opposite directions, thus causing the blades to purge one another of composition which might tend to adhere thereto or build up thereon.

The function of the feeding or transfer means is to assure positive and uninterrupted movement of a composition from the mixing trough or vat 10 to the receiving end portion of the conveyer screw or worm 15 of the extruding screw means, whereby the space or spaces 20 between the rearward helical flights 19 of the conveyer screw or worm 15 are compactly and solidly filled with the composition, and consequently, as the composition is advanced through the housing 16 of the extruding screw means, the entire spiral passage defined by the screw or worm will be packaged with a substantially uniform and homogeneous consolidated mass of the composition free from voids or gaps.

As a consequence of this, the conveyor screw or worm 15 can exert maximum driving pressure upon the composition, which will express the same through the forming die 21, and thereby produce a desired solid extruded formation that is free from defects.

Due to the above described staggered but end to end relation of the blades 28 and 29 carried by the spaced apart shafts 26 and 27, the oppositely revolved blades 28 and 29 moving downwardly between said shafts exert direct downward thrust upon the composition toward the conveyer screw or worm 15, while at the same time the composition is subjected to some lateral back and forth movement within the passage 24 of the casing 22, whereby to further knead and consolidate the same. By reason of this, balling or bridging of the composition within the casing 22 is prevented, and obstruction of free movement of the composition from the trough or vat 10 to the conveyer screw or worm is avoided. As above pointed out, as the inner ends of revolved blades 28 and 29 sweepingly pass one another in mutual contact, the blades are purged of composition which might tend to adhere thereto or build up thereon.

Although the blades 28 and 29 of the above described arrangement comprise two pairs thereof respectively corresponding in length to one half the axial length of the interior of the casing 22, said blades may comprise more than two pairs thereof of shorter length arranged end to end along the shafts, and so that the same are alternated along said shafts, with their opposed sides or ends disposed to sweep each other in passing as the same are oppositely revolved, thereby to attain desired purging effect.

In FIG. 4 is shown a modified form of the feeding or transfer means, except that in place of the blades 28 and 29 of the previously described arrangement, the shafts 26 and 27 are respectively provided with sleeves 32 and 33 respectively equipped with radially projecting fingers 34 and 35, so relatively arranged that the fingers 34 of one are disposed in staggered relation to the fingers 35 of the other, said groups of fingers being revolved in opposite directions by and between the shafts 26 and 27. This modified arrangement is found to be effective with various compositions of tacky, rubbery and like character, since the interengaging fingers 34 and 35 tend to purge one another from the composition, while at the same time operating to forcibly move the composition into the receiving end portion of the conveyer screw or worm 15 of the conveyer screw extruding means, so as to completely and compactly load the same.

It may be here pointed out that, if desired, either the casing 22 or the screw or worm housing 16 or both may be provided with jacketing (not shown) through which may be circulated either a heating medium or a cooling medium, accordingly as heating or cooling of the composition being handled may be found to be desirable.

Having now described the invention, what is claimed is:

1. Apparatus for continuously preparing and extruding a plastic composition comprising a mixing vat having rotatable means to impart mixing agitation to the ingredients of a composition while moving the same toward a discharge end thereof, said discharge end of the mixing vat having a discharge opening, an extruding screw means disposed beneath the mixing vat to receive the composition discharged from the latter, said extruding means comprising a housing, a worm rotatable in the bore of said housing, said housing having an intake opening leading to space intermediate helical flights at the receiving end portion of the worm, and a feeding means interposed between the discharge opening of the mixing vat and the intake opening of the housing of the extruding means, said feeding means comprising a casing, a pair of laterally spaced apart horizontal shafts extending through the interior of said casing parallel to the longitudinal axis thereof and disposed to straddle said axis, said casing providing a passage intermediate said intake and discharge openings, said passage being bounded, by respective semi-circular side walls respectively concentric to said respective shafts therein, means to drive one shaft in one direction and means to drive the other said shaft in opposite direction, each shaft having longitudinally end to end disposed and oppositely projecting radial blades, the respective blades of one shaft being adapted to be revolved between the other shaft and one semi-circular side wall of the casing, with their outer longitudinal margins in sweeping contact with said latter wall, and the radial blades of said other shaft also being adapted to be revolved between said first mentioned shaft and the other semi-circular side wall of the casing, with their outer longitudinal margins in sweeping contact into said other side wall, the blades of one shaft being disposed in staggered relation to those of the other shaft, all whereby opposed ends of the respective sets of blades sweepingly engage and pass one another in mutual contact and downward direction when moving through the casing passage space between the shafts, thereby to purge each other aganist accumulation of composition thereon, while at the same time forcefully impelling the composition through the casing passage and into the extruding means.

2. Apparatus according to claim 1, wherein the driven shaft of the feeding means is actuated by transmission means intermediate the same and the rotatable means of the mixing vat.

3. Apparatus according to claim 1, wherein the blades of each shaft are of lengths corresponding to one-half the axial length of the casing interior.

References Cited in the file of this patent

UNITED STATES PATENTS

| | | |
|---|---|---|
| 1,344,675 | Bubar et al. | June 29, 1920 |
| 1,587,300 | Hanley | June 1, 1926 |
| 2,572,063 | Skipper | Oct. 23, 1951 |
| 2,588,196 | Barbieri | Mar. 4, 1952 |
| 2,617,167 | Johnson | Nov. 11, 1952 |
| 2,646,199 | Paulsen | July 21, 1953 |